June 5, 1962 A. H. CASTELOW 3,037,238
MEANS FOR CUTTING MEMBRANES
Filed Sept. 2, 1958 2 Sheets-Sheet 1

Alfred H. CASTELOW
INVENTOR

June 5, 1962　　　A. H. CASTELOW　　　3,037,238
MEANS FOR CUTTING MEMBRANES

Filed Sept. 2, 1958　　　　　　　　　　　　2 Sheets-Sheet 2

Alfred H. CASTELOW
INVENTOR
By: Wenderoth, Lind & Ponack
Attys ns lines, UNITED STATES PATENT OFFICE 3,037,238
Patented June 5, 1962

3,037,238
MEANS FOR CUTTING MEMBRANES
Alfred Harold Castelow, Blakehurst, New South Wales, Australia, assignor to Sunflex Pty. Limited, Sydney, Australia, a company incorporated of New South Wales
Filed Sept. 2, 1958, Ser. No. 758,512
5 Claims. (Cl. 17—43)

This invention relates to means for cutting membranes such as "goldbeaters" of beef intestines.

A beef intestine comprises an inner and an outer membrane normally secured together by soft tissue. Portion of the outer membrane, about half its circumference, is of superior quality to the remainder of the membrane and is used in the manufacture of racquet gut and surgical sutures. This superior portion is known as the "goldbeater." Means and methods are known for separating the goldbeater at least from the inner membrane.

After separation the goldbeater is cut longitudinally into about four narrow strips or strands.

The present invention relates particularly to the cutting means.

Existing means and methods of cutting have several defects. The knives used do not produce a clean sharp edge so that, when two or more strands are twisted into a gut string or a suture, the surface is fibrous or furry.

Furthermore the methods and means used at present frequently result in damage to the inner membrane which has important commercial uses.

Existing cutting methods are uneconomical in that an excessive amount of the relatively valuable goldbeater is wasted.

Furthermore existing methods do not result in strands of uniform width.

One object of the present invention is to provide cutting or splitting means substantially free from the above defects.

The goldbeater is fed to the cutting means over a guide or horn.

Another object of the present invention is to provide a horn of such a construction that frictional resistance to the passage of the goldbeater over the horn is reduced to a minimum.

In one general form the invention is a goldbeater cutting machine including a rear end guide or horn, an approximately horizontal plate secured to the front of the horn and having spaced parallel longitudinal slits formed through it, transversely spaced guide posts on the plate in front of the slits, rotatable approximately vertical cutter discs coaxially mounted in a frame and means for rotating the discs, the disc spacing being substantially equal to the plate slit spacing, the number of discs equalling the number of slits, the frame being displaceable towards or away from a position in cutting engagement with a goldbeater on the plate and the respective discs being located and dimensioned so that after cutting they partially enter the plate slits.

Preferably means are provided for rotating the discs, at least during the goldbeater cutting operation.

A preferred form of the invention is illustrated in the accompanying drawings in which.

Figure 1:
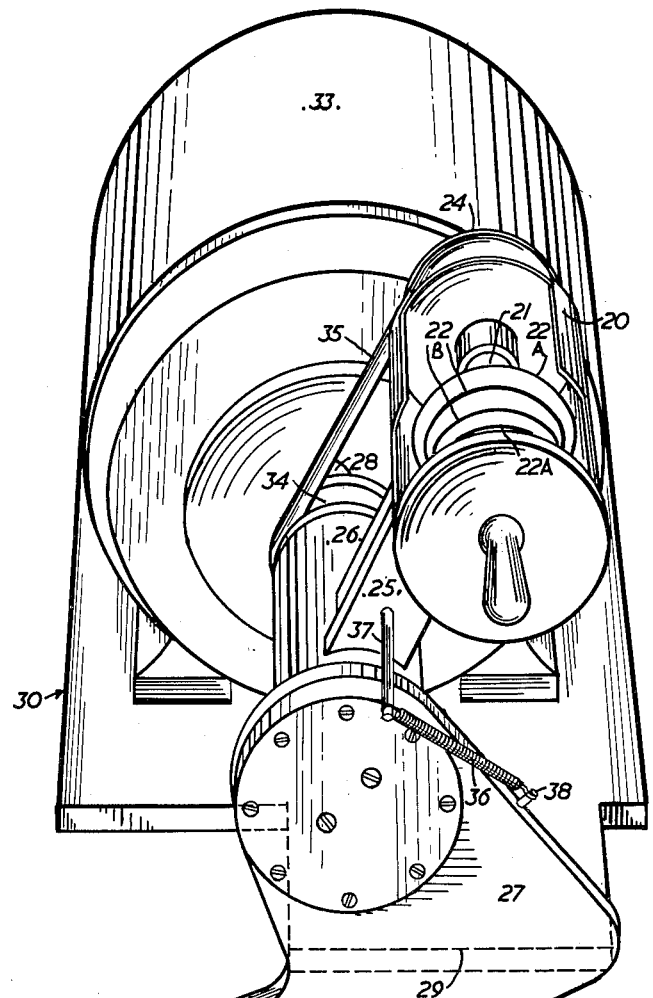
FIG. 1 is a side elevation in perspective of the cutting machine with the frame and cutting discs shown raised clear in the non-operative position.
Figure 1:
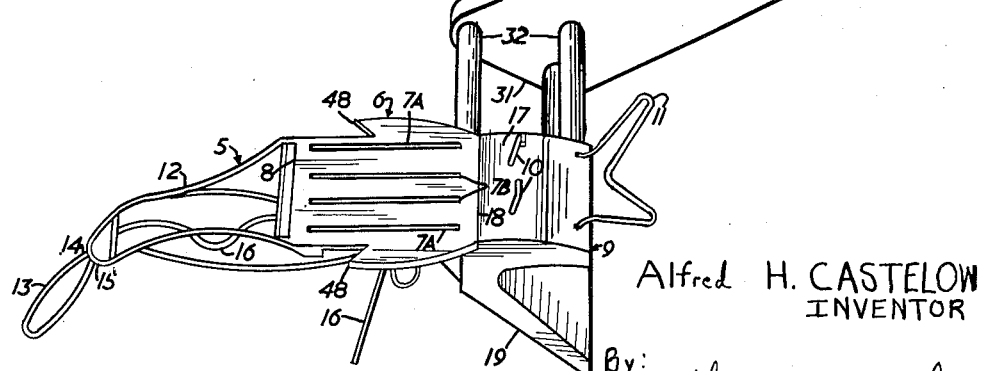

In the preferred form the equipment includes a support comprising, in succession, in the direction of movement of the runner or intestine 4, a horn 5 and a first or main plate 6.

The plate 6 is horizontal and of smooth metal or other suitable material. Four spaced similar parallel slits 7 are formed through the plate 6 and extend forwards for a short distance from near to the rear edge 8 of the plate.

The plate 6 is detachably mounted on a bed plate 9. Other plates 6 can be substituted having fewer or more than four spaced slits 7. The number of posts 10 is made one fewer than the number of cut strands, i.e. two fewer than the number of slits 7.

Secured to the bed plate 9 are two spaced aligned upright guide posts 10, the posts being bent slightly inwards at their upper ends.

The guide posts 10 are spaced between the longitudinal axes of both pairs of inner and outer slits 7A and 7B. In front of the guide posts 10 is an upright M-shaped guide 11. The slit spacing corresponds to the spacing of cutter discs to be described later.

The horn 5 is of stiff wire frame construction and extends downwards and rearwards from the rear edge 8 of the plate 6. It comprises a long front section 12 and a short rear section 13. The front section 12 is a V or U wire converging rearwards and secured at its front ends to the plate 6. The rear section 13 is a loop narrow at its front end 14 and secured at that end to the front section rear end 15. A single central fore and aft wire 16 is secured to the rear 15 of the front section 12 and extends forwards and upwards and then forwards and downwards. The top 17 of the second or bed plate 9 extends downwards and forwards at about 5° from the front end 18 of the main plate 6.

The underside 19 of the bed plate extends forwards and downwards at about 45° to the top 17.

A cylindrical frame 20 is provided in which are secured to an axle 21 mounted in the frame 20, similar spaced cutter discs 22A and 22B, the disc spacing corresponding to the required width of the strands into which the goldbeater 4 is to be cut.

The diameter of the outer pair of discs 22A is greater than that of the inner pair 22B for a purpose to be described later. Spacing collars 23 are loosely mounted on the axle 21 between the discs 22 and the distance between discs can be varied by the use of collars of various widths. An extension of the axle 21 carries a belt pulley 24 and a web or arm 25 connects the frame 20 to a sleeve 26, the axis of which is parallel to the axle 21 mounted in the frame 20. The sleeve 26 is rotatably mounted on a supporting bracket 27 about an axle 28 parallel to and spaced from the frame axle 21.

The supporting bracket 27 is a suitably contoured vertically disposed plate which is rigidly secured to one end 29 of a base plate 30. The bed plate 9 is rigidly secured to the bottom 31 of the bracket plate 27, in spaced fashion by three horizontal rods 32. A suitable prime mover such as an electric motor 33 is mounted on the base plate 30 with its armature shaft directly coupled to the axle 28.

A second driven belt pulley 34 is mounted on the axle 28. The pulleys 24 and 34 are connected to a belt 35. This construction enables the cylinder frame 20 and pulley 24 to be rotated bodily about the sleeve axis 28 while the belt 35 is moving. The cylinder frame 20 and the pulley 24 are mounted above the horn 5 and plate 6 with the cylinder axle 21 parallel to the main plate surface, and at right angles to the direction of motion of a runner 4 over the horn 5 and plate 6.

Figure 2:
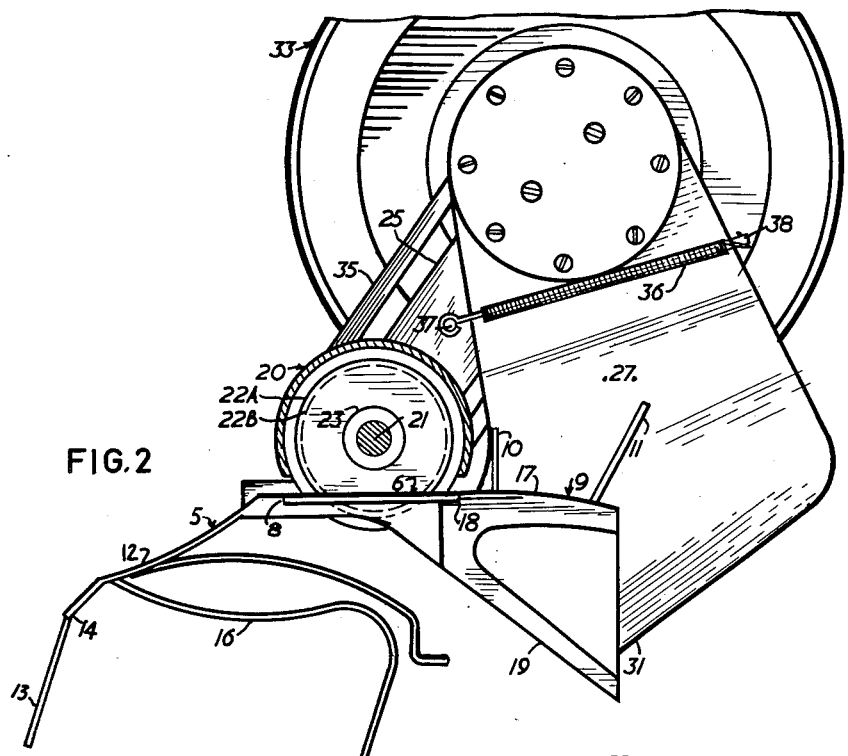
FIG. 2 is a side elevation with the frame and cutting discs shown in the lowered cutting position, the end of the frame being cut away to reveal the discs.
Figure 3:
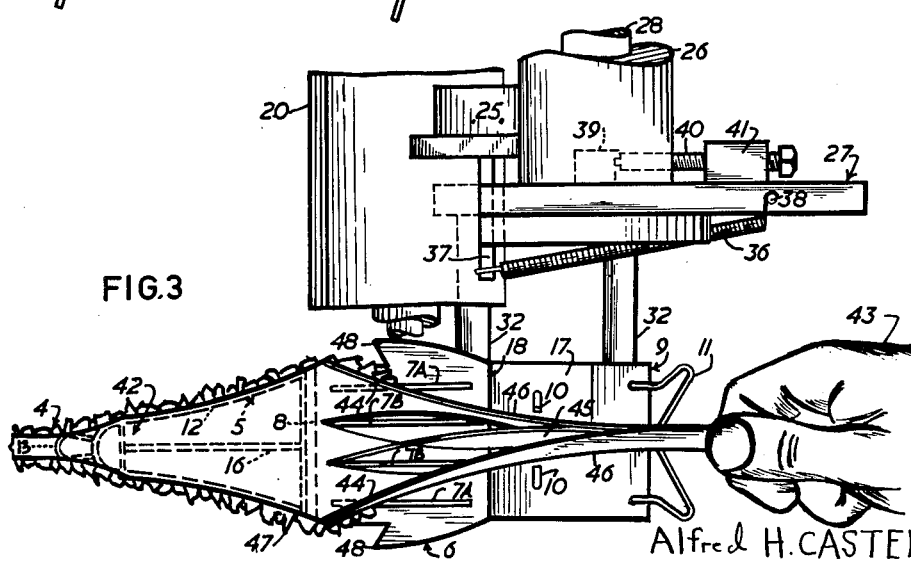
FIG. 3 is a fragmentary plan view with part of the frame and the cutting discs omitted, and showing an intestine engaged over the horn and the three bands cut from the goldbeater shown twisted and resting in the M shaped guide.

It can now be seen that the frame 20 can be swung upwards to a position clear of the plate 6 as shown in FIG. 1; or may be swung downwards to a position directly above the plate 6 with the discs 22 entering the slits 7. A tension spring 36 is secured between FIGS. 37 and 38 mounted on the arm 25 and bracket plate 27 respectively. The spring normally urges the frame 20 into either of the extreme positions of its arcuate travel. A stop 39 (see FIG. 3), extending radially from the sleeve 26, contacts a screwed stud 40, threadibly mounted in block 41 secured to the bracket plate 27 adjustably limits the depth to which the discs 22 enter the slits 7 when the frame 20 is in the lowered position as shown in FIGS. 2 and 3.

In use the goldbeater 42 and inner membrane are partly separated and the open end of the runner 4 is drawn onto the rear end 13 of the horn 5 with the latter between the goldbeater 42 and the inner membrane. The runner 4 is then drawn forwards over the main plate 6 with the goldbeater 42 uppermost and in contact with the plate surface.

The frame 20 and cutting discs 22 are then lowered so that four cuts are made in the goldbeater 42. The frame 20 is then raised clear and the free end of the goldbeater 42, which is held in the operator's hand 43, is twisted through 180°. This has the effect of raising the outer edges 44 of the goldbeater 42 and positioning them over the outer slits 7A; the inner slits 7B remaining clear. The frame 20 and discs 22 are again lowered momentarily so that the outer larger diameter discs 22A produce short diagonal cuts in the outer edges 44 of the goldbeater. The frame 20 is raised and the goldbeater 42 is untwisted to its original position and the frame 20 again lowered. The operator then draws the three cut bands of the goldbeater forwards and positions the centre band 45 between the guide posts 10 and in the V of the M guide 11. The outer bands 46 are positioned one to each side the guides 10 and M guide 11. The diagonal cuts previously described allow the fatty tissue 47 adhering to each side of the goldbeater 42 to fall clear of each side of the plate 6. The said plate 6 is also provided with rearwardly directed V shaped guides 48 to assist in clearing the fatty tissue 47.

Because the runner or intestine 4 is naturally curved along its longitudinal axis as well as being of circular cross section it was found that the central cut band 45 of the goldbeater 42 was not subjected to such tension as were the outer bands 46 under the distending influence of the horn. This resulted in a puckering of the central band 45 after it was cut, thus producing a band of varying width. This effect is undesirable and to avoid it the outer discs 22A were made with greater diameter than the inner discs 22B. The outer discs 22A therefore produce their cut in the goldbeater 42 a fraction of an inch earlier than the inner discs 22B. This has been found to counteract the puckering effect.

As the intestine 4 is drawn forward by the operator the central horn wire 16 and the lower portion 19 of the bed plate 9 guide the runner, other than the goldbeater 42, away from the main plate 6.

The drawing through of the runner 4 may be carried out mechanically. For this purpose the runner 4, after cutting, is drawn between two rollers (not shown) in front of the machine.

The roller axes are parallel, horizontal and at right angles to the direction of forward movement of the runner. One roller has spaced ribs or teeth parallel to its axis. Preferably the section of each rib is rectangular. The other roller is smooth. As the cut runner passes between the rollers, the ribs grip it and maintain the separated strands with their side edges parallel to the direction of movement.

The M frame 11 is, of course, dispensed with.

The wire 16 shown in FIGS. 1 and 2 can be bent about its inner end connection to 13 so that the spacing of its free end may be varied according to variation in the internal diameter of each runner so that the runner may be kept transversely stretched.

What I claim is:

1. A goldbeater cutting machine including a rear end guide over which an intestine is threaded with said guide between the goldbeater and the inner membrane, an approximately horizontal plate secured to the front of the guide over which plate the goldbeater slides, said plate having spaced parallel longitudinal slits formed through it and rearwardly directed V-shaped notches in the sides of said plate between the ends of said slits for clearing the edge of the goldbeater of fatty tissue, transversely spaced guide posts on the plate in front of the slits for guiding the outer strips of the goldbeater, rotatable approximately vertical cutter discs for cutting the goldbeater, a frame in which said cutter discs are rotatably mounted, and means for rotating the discs, the disc spacing being substantially equal to the plate slit spacing, the number of discs equaling the number of slits, the frame being displaceable towards or away from a position in cutting engagement with a goldbeater on the plate and the respective discs being located and dimensioned so that after cutting they partially enter the plate slits.

2. A machine as in claim 1 wherein the number of slits is at least four and the number of posts is two fewer than the number of slits.

3. A machine as in claim 1 wherein the diameter of the two outer discs slightly exceed those of the inner discs.

4. A machine as in claim 1, including an approximately central upright M guide frame mounted in front of the guide posts for guiding the strips of goldbeater together after they pass said guide posts.

5. A machine as in claim 1 including rotatable roller means for drawing the cut goldbeater forwards.

References Cited in the file of this patent

UNITED STATES PATENTS

| | | |
|---|---|---|
| 1,155,393 | Ziprick | Oct. 5, 1915 |
| 1,854,426 | Redemske | Apr. 19, 1932 |
| 1,854,481 | Mudd | Apr. 19, 1932 |
| 2,024,715 | Bennett | Dec. 17, 1935 |
| 2,094,987 | Klahre | Oct. 5, 1937 |
| 2,533,996 | Clarkson | Dec. 12, 1950 |
| 2,554,298 | Ferguson | May 22, 1951 |
| 2,595,638 | Castelow | May 6, 1952 |
| 2,697,245 | Clemens et al. | Dec. 21, 1954 |
| 2,720,678 | Valentine et al. | Oct. 18, 1955 |